United States Patent
Tischer (10) Patent No.: US 7,873,261 B2
(45) Date of Patent: Jan. 18, 2011

(54) METHODS, SYSTEMS, AND COMPUTER-READABLE MEDIA FOR PROVIDING ALTERNATIVE MEDIA CONTENT

(75) Inventor: Steven Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1169 days.

(21) Appl. No.: 11/513,698

(22) Filed: Aug. 31, 2006

(65) Prior Publication Data

US 2008/0193102 A1 Aug. 14, 2008

(51) Int. Cl.
*H04N 7/26* (2006.01)
(52) U.S. Cl. .......................................... 386/68; 386/69
(58) Field of Classification Search ................. 386/68, 386/67, 124, 125, 92, 46, 6
See application file for complete search history.

(56) References Cited

U.S. PATENT DOCUMENTS

2006/0090009 A1* 4/2006 Gopalakrishnan et al. ... 709/246
2006/0209076 A1* 9/2006 Maeng ....................... 345/473

* cited by examiner

*Primary Examiner*—Robert Chevalier
(74) *Attorney, Agent, or Firm*—Hope Baldauff Hartman, LLC (57) ABSTRACT

Methods, systems, and computer-readable media provide for the display of overlying alternative media content in real time upon the initiation of a fast-forwarding action associated with underlying media content. According to implementations, a method includes displaying underlying media content at a first playback rate. A modification of the playback rate, from a first rate to a second rate, is detected. As a result of detecting the second playback rate, alternative media content is retrieved and displayed. According to one aspect, the underlying media content is television programming while the alternative media content is screen frames selected from the television programming at predetermined time intervals. According to another aspect, the alternative media may include media content that is unrelated to the television programming.

20 Claims, 10 Drawing Sheets

302A: TOTAL AD TIME / FAST FORWARD RATE = FAST FORWARD DURATION

302B: 60 SECONDS / 10X = 6 SECONDS

304A: FAST FORWARD DURATION / DESIRED DISPLAY TIME FOR EACH FRAME OF ALTERNATIVE MEDIA CONTENT = NUMBER OF FRAMES TO GRAB FROM UNDERLYING MEDIA CONTENT

304B: 6 SECONDS / 1 SECOND = 6 FRAMES

306A: NUMBER OF FRAMES TO GRAB FROM UNDERLYING MEDIA CONTENT / FAST FORWARD DURATION = REQUIRED DISPLAY TIME FOR EACH FRAME OF ALTERNATIVE MEDIA CONTENT

306B: 6 FRAMES / 6 SECONDS = 1 FRAME / SECOND

METHODS, SYSTEMS, AND COMPUTER-READABLE MEDIA FOR PROVIDING ALTERNATIVE MEDIA CONTENT

TECHNICAL FIELD

This application relates generally to the field of rich media advertising. More specifically, the disclosure provided herein relates to the field of providing alternative media content while primary media content is played back at an increased or otherwise modified rate.

BACKGROUND

Successful television advertising, or commercials, can be critical to the success of many businesses. Depending on numerous factors, including the length of a commercial, the day and time that the commercial is played for the viewing audience, and the number of times the commercial is played, advertising on television can be an extremely expensive endeavor. Companies often spend a significant portion of their revenue on advertising in an effort to attract the attention of their targeted demographic. The success of a television commercial, however, is dependent in large part upon its viewing by the target audience. If a commercial is not seen, it cannot be effective.

Being subjected to television commercials is a source of inconvenience to some viewers who have tuned to a particular television broadcast for the purpose of watching the broadcast as quickly as possible, without having to watch commercials with no perceived relevance to their lives, even if such relevance exists. These viewers often record television broadcasts with the purpose or benefit of being able to fast-forward through the commercials. Digital video recorders ("DVRs") enable television viewers to record their desired television shows to a hard drive and watch them at their convenience. DVRs are typically easy to use, and have therefore made recording and fast-forwarding television content simple. Unfortunately for the advertisers spending a lot of money for their advertisements to be seen, the result is that advertisements are easily and often skipped. With the increasing popularity of DVRs, advertisements are being seen by fewer people, and are therefore becoming less effective.

SUMMARY

According to one aspect of the disclosure presented herein, methods and computer-readable media provide alternative media content while underlying media content is played back at an increased or otherwise modified rate. According to one implementation, a method includes displaying underlying media content at a first playback rate. A modification of the playback rate, from a first rate to a second rate, is detected. As a result of detecting the second playback rate, alternative media content is retrieved and displayed. According to one aspect, the underlying media content is television programming while the alternative media content is screen frames selected from the television programming at predetermined time intervals. According to another aspect, the alternative media may include media content that is unrelated to the television programming.

The television programming may include a commercial advertisement. According to one implementation, the predetermined time intervals for selecting screen frames from the commercial advertisement are determined from the duration of the commercial advertisement, the second playback rate, and a desired number of screen frames to display during the playback of the commercial advertisement at the second playback rate. According to a further implementation, the predetermined time intervals for selecting screen frames from the commercial advertisement are retrieved from a data structure associated with the commercial advertisement. The data structure includes data corresponding to the commercial advertisement duration, as well as the time intervals for retrieving select screen frames according to the second playback rate and commercial advertisement duration.

According to a further aspect of the disclosure presented herein, a method provides selected media content during the fast-forwarding of underlying media content. The underlying media content is provided to a display at a first playback rate. The playback of the underlying media content is fast-forwarded from the first playback rate to a second playback rate. One or more screen frames of the underlying media content are grabbed and provided to the display during the fast-forwarding of the underlying media content. These select screen frames are provided for display at a playback rate that is slower than the second playback rate associated with the fast-forwarding. According to further aspects, the method includes detecting a return to the first playback rate from the fast-forwarding second playback rate, at which time the display of only select screen frames from the underlying media content is discontinued. According to one implementation, the underlying media content is a commercial advertisement which is inserted within a primary media content and the transition from the primary media content to the commercial advertisement is detected. Upon detecting a return from the commercial advertisement to the primary media content, the display of the screen frames from the commercial advertisement is discontinued.

According to yet another aspect of the disclosure presented herein, a method provides alternative media content while providing underlying media content at a modified playback rate. The underlying media content is first displayed according to a playback rate. A modification of the playback rate is detected. A determination is made as to the duration of the playback of the underlying media content at the modified playback rate, which is used to select alternative media content. The alternative media content is displayed for the duration of the playback of the underlying media content at the modified playback rate. The duration of the playback of the underlying media content at the modified playback rate may be estimated or actual.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 6-8B are flow diagrams illustrating methods provided herein for providing alternative media content while providing underlying media content at a modified playback rate according to various embodiments presented herein.

DETAILED DESCRIPTION

The following detailed description is directed to methods and computer-readable media for providing overlying media content including providing alternative media content while underlying media content is provided at a modified playback rate. In the following detailed description, references are made to the accompanying drawings that form a part hereof, and which are shown by way of illustration specific embodiments or examples.

As discussed briefly above, commercial advertising may be extremely beneficial, but only if the commercials are reaching the targeted audience. Due to the ease of use and various benefits provided by digital video recorders ("DVRs"), an increasing amount of consumers are purchasing DVRs and consequently taking advantage of the ability to quickly and easily fast-forward through commercials. Because DVRs continuously record television programming as it is broadcast and allow consumers to watch the programming content while it is being recorded, consumers are increasingly delaying the start of their desired television program for a length of time that allows them to watch the desired television program, fast-forward through the commercials as they watch the program, and "catch up" to the live program at substantially the same time that the live program ends. This effectively allows consumers to watch commercial-free television contrary to the intent of the advertisers as well as the television content providers.

The disclosure provided herein describes systems and methods that allow advertisers to present a subset of media material as alternative media content to a viewer as the underlying commercial content is being fast-forwarded. As a commercial is fast-forwarded, frames from the commercial or other alternative media are displayed over the fast-forwarded commercial for the duration of the fast-forwarding. As will be described below, the overlying frames forming the alternative media may be selected at random, selected according to instructions embedded with the underlying commercial, or selected according to instructions stored on the DVR itself. Referring now to the drawings, in which like numerals represent like elements through the several figures, aspects of the methods and computer-readable media provided herein will be described.

Figure 1:
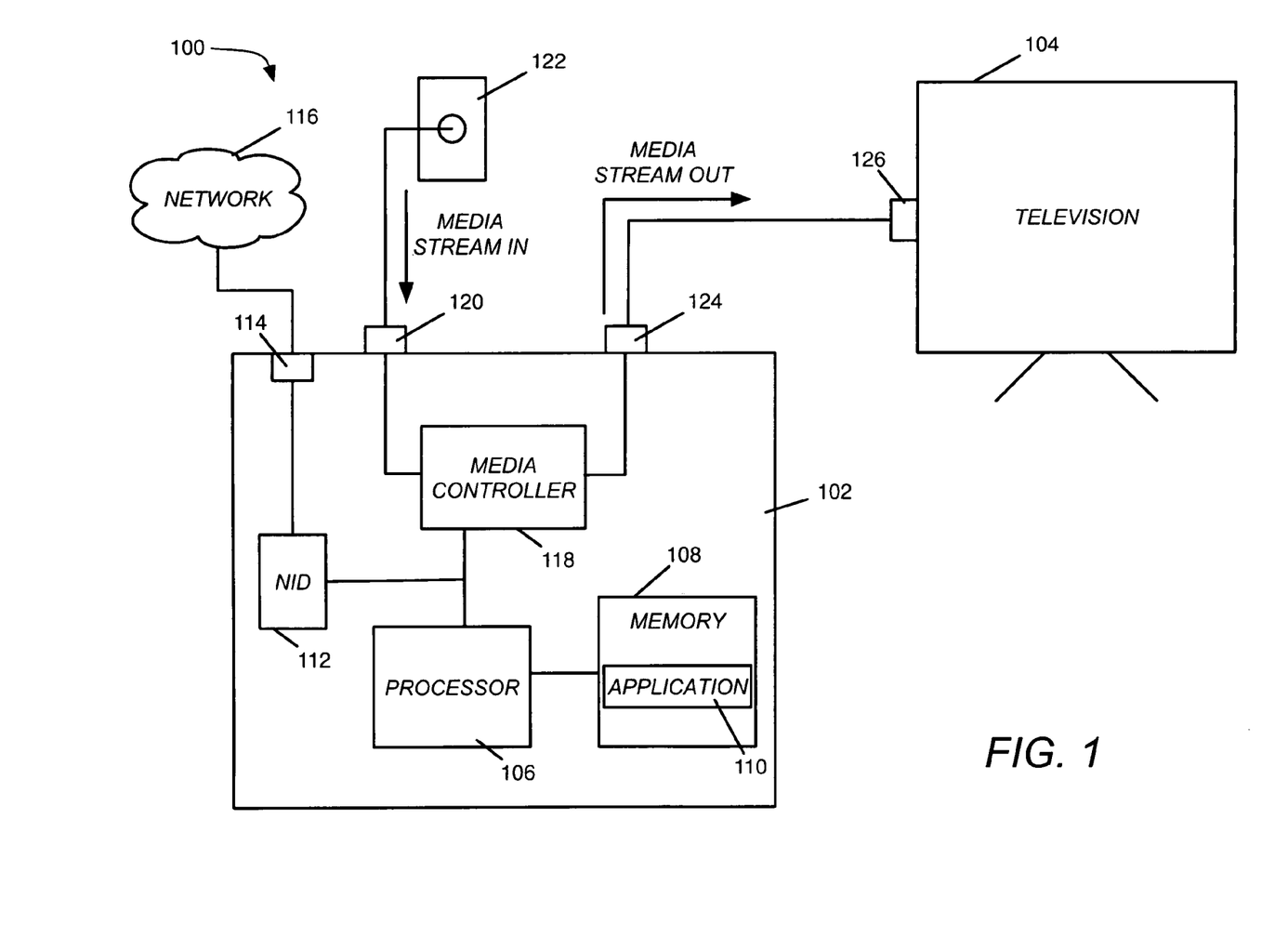
FIG. 1 is a block diagram showing aspects of an illustrative operating environment for the disclosure presented herein.

FIG. 1 shows an illustrative operating environment 100 for an embodiment according to the invention. The environment 100 includes a DVR 102 and a display device 104. It should be appreciated that the display device 104 may be a television, computer monitor, or any other display device capable of receiving and displaying media signals. It should further be appreciated that "DVR" as used herein may not only be a digital video recorder, but also may be any media recording or playback device capable of receiving media signals, processing the signals according to the disclosure below, and providing the same media signals, modified media signals, and/or separate and distinct media signals to the display device 104. The media signals may be component-based or packet-based or any other multi-media container format.

The DVR 102 includes a processor 106 for controlling the operation of the DVR 102. The processor 106 may comprise a general purpose central processing unit ("CPU"), a more specific purpose programmable logic controller ("PLC"), a programmable gate array, or other type of processor known to those skilled in the art and suitable for controlling the operation of the DVR 102. The processor 106 is connected to a memory 108. The memory 108 may comprise a volatile or non-volatile memory that includes program code executed by the processor 106 for controlling the operation of the DVR 102. In particular, as will be discussed in greater detail below, the memory 108 may include an alternative media content application 110 which, when executed by the processor 106 of the DVR 102, provides alternative media content to the display device 104 while underlying media content is being fast-forwarded. It should be understood by those skilled in the art that the alternative media content application 110 may be stored on a computing device separate from, but communicatively connected to, the DVR 102 such that the DVR 102 may receive instructions from the alternative media content application 110 regarding the playback of alternative media content during the fast-forwarding of underlying media content. For example, a computing device including the alternative media content application 110 may be communicatively connected to the DVR 102 through a wired or wireless network or any other type of connection allowing transmission of data between the computing device and the DVR 102.

The processor 106 may be further connected to a network 116 via a network interface device 112 and network connector 114. The DVR 102 may receive media content, instructions, or other communications via a wired or wireless connection to the network 116. The DVR 102 additionally includes a media controller 118 for receiving and transmitting media signals via a media input 120 and a media output 124. The media input 120 may be a coaxial input for connecting the DVR 102 to a coaxial wall connector 122 via a coaxial cable for receiving a media signal from a source such as a cable television provider. It should be understood by those with skill in the art that the media input 120 and the media output 124, as well as a media input 126 on the display device 104, may include any type of audio and video connectors and transmission means, wired and wireless, including but not limited to RCA, S-Video, USB, BLUETOOTH, fiber optic, coaxial, component, and high definition multi-media interface ("HDMI") or other encrypted or protected connectors and transmission means. It should also be appreciated that the media signal may be transmitted via internet protocol ("IP") such as with video over IP and voice over IP. With an IP media signal, the media input 120 may be a digital subscriber line ("DSL") or coaxial cable connector. As used herein, "media" and "media content" includes audio signals, video signals, both audio and video signals, static images, or any other type of content that may be presented to and sensed by a user.

Figure 2A:
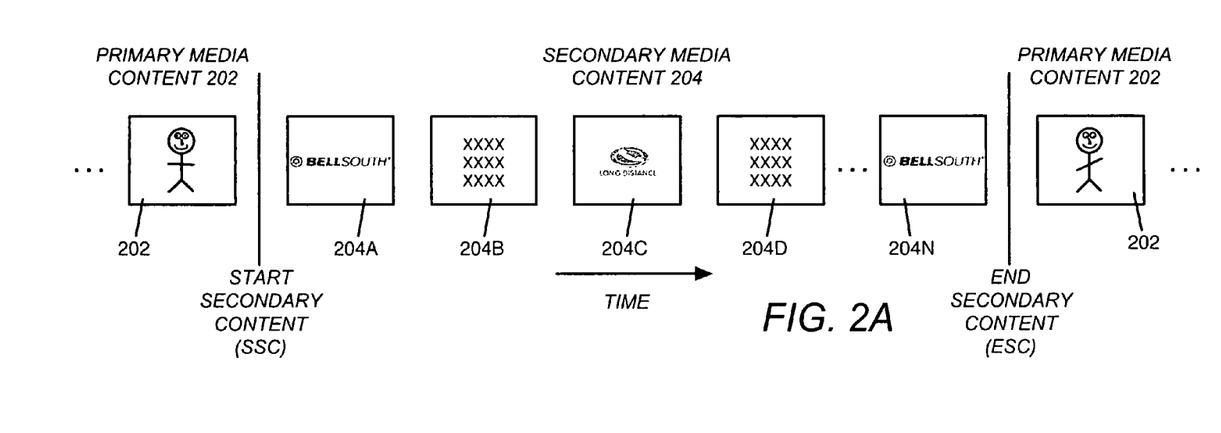
FIGS. 2A-2D are functional diagrams showing illustrative examples of transitions between primary media content, commercial content, and alternative media content under various fast-forward conditions according to various embodiments presented herein.

Turning now to FIGS. 2A-2D, several operational examples will be given to show various transitions between underlying media content and alternative media content under various fast-forward conditions according to embodiments described herein. FIG. 2A shows a timeline illustrating the transitions between primary media content 202 and secondary media content 204. As used throughout, the term "underlying media content" describes any media content shown on a display such as a television. The underlying media content may be broadcast live from a cable or satellite company, or may be stored on a DVR and replayed on a television. When described in terms of fast-forwarding, it should be appreciated that the underlying media content must at least in part be stored in order to allow for fast-forwarding. The underlying media content includes primary media content 202 and secondary media content 204. Primary media content 202 defines a portion of the underlying media content that is displayed for a viewer at a real time rate as intended by the original broadcaster, while secondary media content 204 defines a portion of the underlying media content that is displayed at an accelerated or otherwise modified rate according to a user initiated input. It should be understood that while the examples discussed herein describe a viewer watching a program and fast-forwarding through the commercials, the disclosure presented herein is equally applicable should the viewer fast-forward through the program content. In either implementation, the underlying media content is being subject to a fast-forwarding action, at which time the alternative media content 205 is displayed for the viewer. The term "alternative media content" is used to describe the overlying media content that is displayed during a change in the playback rate of the underlying content, such as for the duration of a fast-forwarding action. As will be described below, the alternative media content may be screen frames selected and grabbed from the underlying content or may be any other type of stored or streaming media.

FIG. 2A shows underlying media content being displayed for a viewer, which consists of primary media content 202 and secondary media content 204. Solid vertical lines show the start and end times of a commercial broadcast or other secondary media content at "SSC" and "ESC," respectively. At SSC, the secondary media content 204 is shown for the viewer. The secondary media content 204 is made up of a number of screen frames 204A-204N that are displayed at a real time rate. The term "real time" as used herein means displayed at a rate for which the advertiser or original broadcaster intended it to be seen, without a viewer altering the viewing rate by manually fast-forwarding, decreasing the playback rate, or rewinding the content. Secondary media content in the context of a television commercial is typically played for a duration of 30 or 60 seconds and a single commercial break from the primary media content 202 may include multiple commercials. For simplicity, FIGS. 2A-2D show the primary media content 202 being interrupted for a single commercial as the secondary media content 204. At ESC, the playback of secondary media content 204 is complete and the primary media content 202 returns.

Figure 2B:
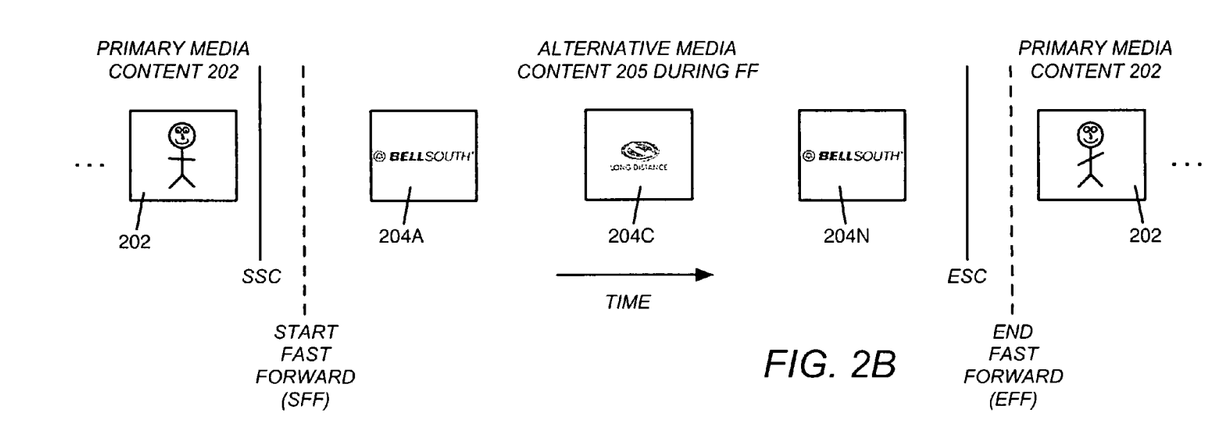

Turning now to FIG. 2B, one implementation is shown wherein a viewer fast-forwards secondary media content 204 until the playback of the secondary media content is complete and the primary media content 202 returns. As seen in FIG. 2B, the primary media content 202 is interrupted and the secondary media content 204 begins at SSC. The viewer immediately begins to fast-forward the secondary media content 204. Throughout FIGS. 2B-2D, the start and end times of a fast-forwarding action are represented with a broken vertical line coupled with "SFF" and "EFF" respectively. According to one implementation described herein, rather than the viewer seeing the screen frames 204A-204N of the secondary media content 204 displayed at an accelerated rate, the viewer is presented with alternative media content 205 for a predetermined amount of time. According to this implementation, the alternative media content 205 includes select frames from the secondary media content 204 shown in real time or cycled similar to a slideshow, with each frame displayed for the duration of the secondary media content 204 or for the duration of the fast-forwarding action. The alternative media content application 110 may present the select frames from the secondary media content 204 with various transition effects between frames, such as scrolling, fading, dissolving, inserting transition messages or other media, or any other type of transition effect.

It should be understood that as the select screen frames or other alternative media content 205 as described below is being displayed for a viewer while the underlying media content is being fast forwarded, the underlying media content may be visible in the background, in a smaller viewing window, or completely obstructed by the alternative media content 205. The example shown in FIG. 2B shows frames 204A, 204C, and 204N being grabbed from the secondary media content frames 204A-204N shown in FIG. 2A and displayed in a slideshow manner as the alternative media content 205 until the secondary media content 204 is complete at ESC. When the secondary media content 204 is complete at ESC, the viewer discontinues the fast-forwarding at EFF and the primary media content 202 is displayed in real time.

A process utilized to select the frames within the secondary media content 204 to be shown to the viewer during the fast-forwarding of commercials may occur in various ways. The specific process used may be defined by the alternative media content application 110 stored within the memory 108 of a DVR 102. Alternatively, as described below with respect to FIG. 5, the process may be defined by a data structure provided along with the underlying media content by the television broadcaster. One method for which the alternative media content 205 may be selected during times of fast-forwarding is to grab a frame of the secondary media content 204 at SFF and display that frame for a predetermined time. That duration may be stored in the memory 108 and utilized by the alternative media content application 110 to determine when the next frame of the secondary media content 204 should be grabbed to replace the current frame being displayed. This process continues in slideshow fashion until EFF when the fast-forwarding ceases, at which time the display returns to the primary media content 202. Another method for selecting frames from the secondary media content 204 to be displayed during fast-forwarding is to grab frames according to a formula based on the actual or estimated duration of the secondary media content 204 and the desired number of frames to grab or the desired duration of display of each frame grabbed. This method will be described in detail below with respect to FIGS. 3 and 4. Yet another method for selecting frames for the alternative media content 205 to be displayed during fast-forwarding is based on information stored within a data structure transmitted with the media stream provided by the television broadcaster. This method will be discussed in detail below with respect to FIG. 5.

It should be appreciated that with this implementation and others described herein, the alternative media content 205 that is displayed over the fast-forwarded content may be triggered by the fast-forwarding action itself or triggered by the fast-forwarding action as long as the underlying media content is a commercial. Similarly, the alternative media content 205 is discontinued when the fast-forwarding action ceases or when the commercial ceases. The implementations that depend upon the underlying media content being a commercial or that discontinue the alternative media content 205 upon the termination of a commercial require that the beginning and the end of a commercial be detected by the alternative media content application 110 or other application executed by the processor 106.

Known methods exist for detecting the beginning and end of commercial programming. Examples include detecting an increase in an average programming sound level, which indicates a commercial has begun since many commercials are broadcast at a louder volume to attract attention. A detected decrease in an average programming sound level would indicate a return to the regular programming. Another method utilizes a detection of black frames before and after commercials that are often used to transition between regular programming and commercial programming to detect the beginning and end of the commercial. A combination of visual and audible changes may also be used to detect commercial programming. Another method for detecting the boundaries of commercial content 204 according to an implementation described in detail below with respect to FIG. 5 includes utilizing information stored within a data structure transmitted with the commercial content media stream provided by the television broadcaster.

Figure 2C:
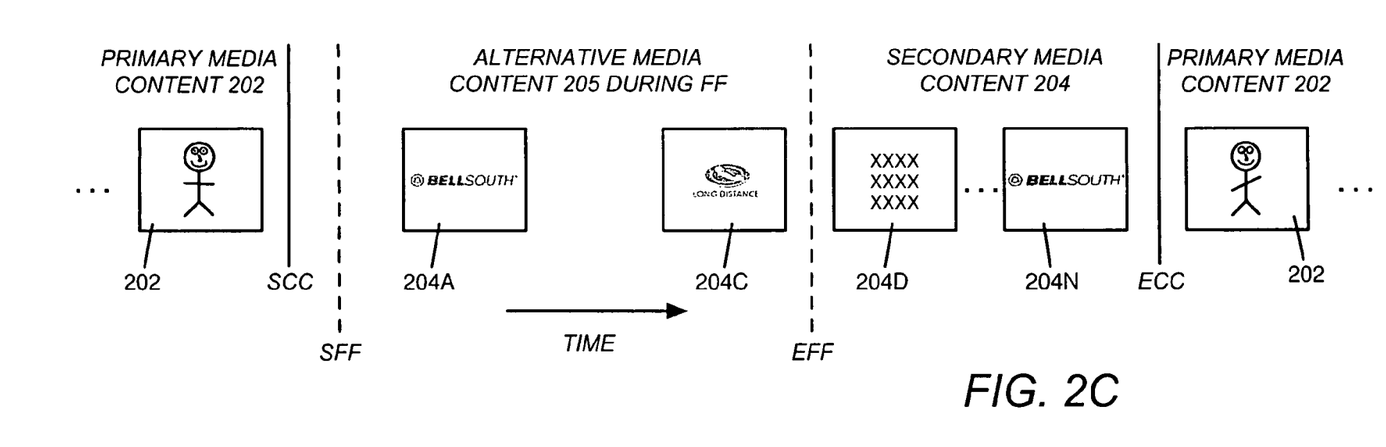

Looking now at FIG. 2C, an exemplary implementation is shown that is similar to that of FIG. 2B, however, the viewer discontinues the fast-forwarding action prior to the end of the secondary media content 204. As seen in FIG. 2C, the EFF occurs just after screen frame 204C is pulled from the secondary media content 204 and displayed for the viewer. Immediately after EFF, the secondary media content 204 resumes in real time with screen frame 204D. This example shows that the alternative media content 205 is dependent on the fast-forwarding action by the viewer. As discussed briefly above, the alternative media content 205 may be additionally dependent upon the secondary media content 204 being a commercial. For example, according to this implementation, if SFF occurred prior to SSC such that the primary media content 202 was being fast-forwarded, the viewer would see the primary media content 202 in an accelerated viewing rate as is the typical situation as it exists prior to this disclosure. However, upon detecting SSC through a method described above, the alternative media content 205 would display for the viewer until which time EFF occurs or ESC since either discontinuing the fast-forwarding action or detecting the end of the commercial content would terminate the display of the alternative media content 205.

Figure 2D:
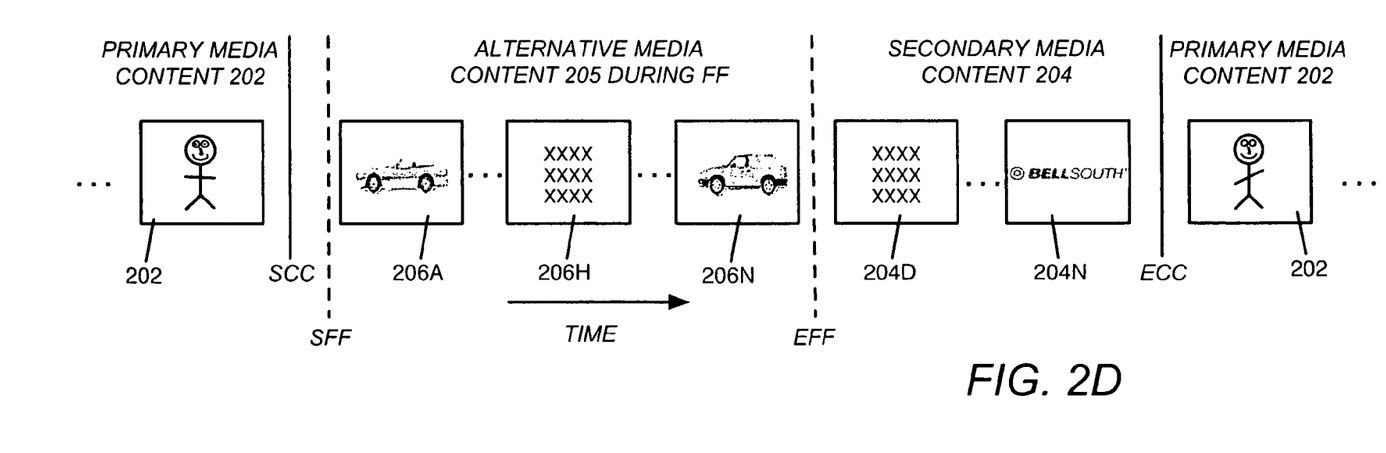

FIG. 2D illustrates an implementation in which the alternative media content 205 shown during a fast-forward action is not screen frames grabbed from the underlying media content. Rather, the alternative media content 205 may be completely disassociated from the underlying media content. As seen in the illustrative example, a BELLSOUTH commercial is being subjected to fast-forwarding by a viewer. In this example, the alternative media content 205 is an automobile commercial that is displayed until EFF, at which time the BELLSOUTH commercial would resume in real time. In this manner, television broadcasters could sell typical advertising space within the secondary media content as well as selling alternative advertising space for those advertisers that anticipate fast-forwarding and wish to take advantage of it. The alternative media content 205 may be stored in the memory 108 of the DVR 102 or in any memory external to the DVR 102. The alternative media content 205 may include screen shots displayed in a slideshow manner as described above, or may be video, images, and/or audio. It should be understood that the alternative media content 205 may be played by the media controller 118 at a real time rate while the underlying media content is being fast-forwarded in the background, or may be played in a slower rate corresponding to the rate of acceleration of the underlying media content so that the alternative media content 205 appears in a real time rate due to the fast-forwarding action. It should be appreciated that the alternative media content 205 may be images, video, or any other media stored in the memory 108 of the DVR 102 by a viewer. As an example, a viewer may store family photos within the memory 108 or the DVR 102 such that whenever she fast-forwards through a commercial or a television program, pictures of her family are displayed in a slideshow manner for the duration of the fast-forward action.

Figure 3:
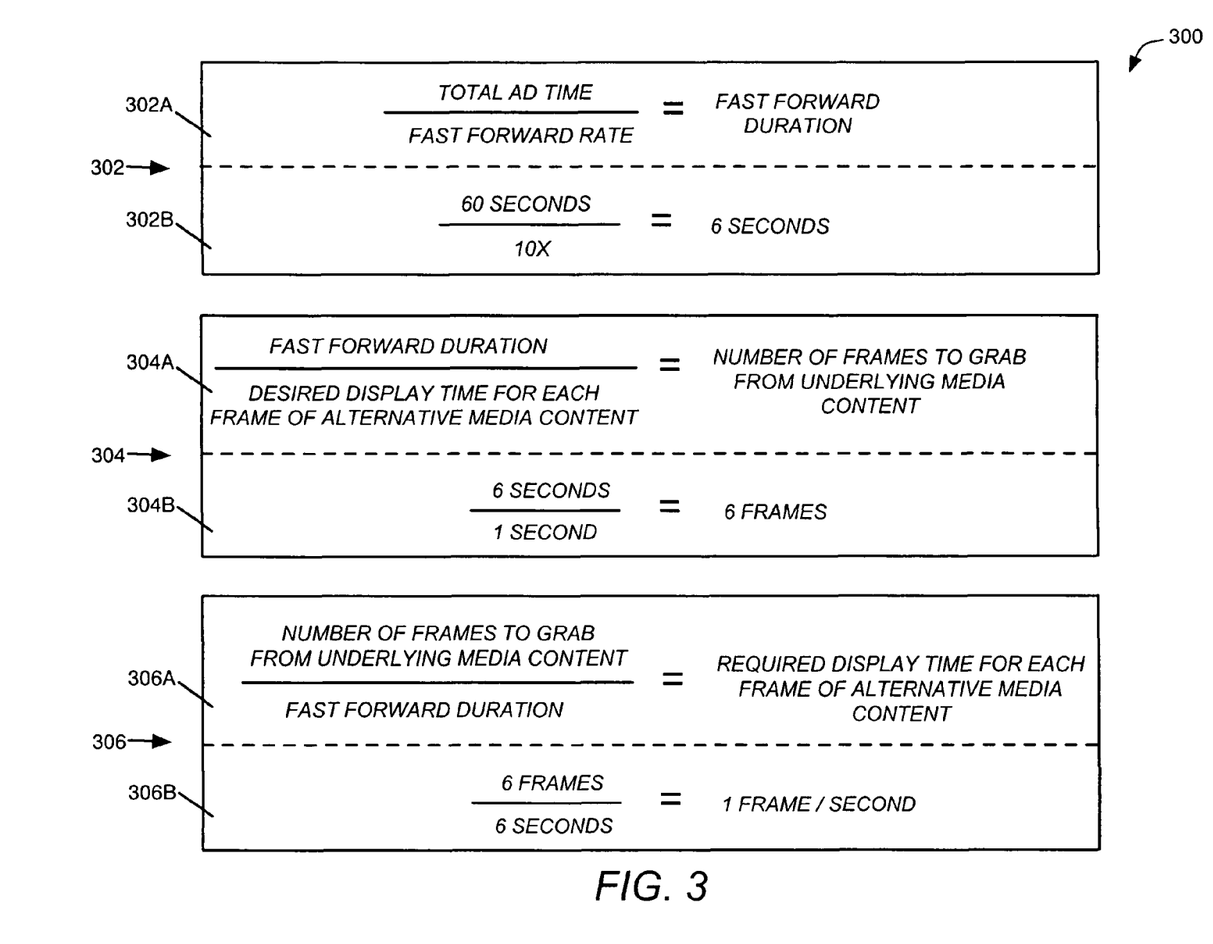
FIG. 3 is a block diagram showing illustrative examples of calculations used in determining various alternative media content characteristics according to one embodiment presented herein.

Turning now to FIG. 3, examples of calculations 300 used in determining various alternative media content characteristics will be described. As described briefly above, one method for selecting frames from the underlying media content to be displayed as the alternative media content 205 during fast-forwarding is to grab frames according to formulas based on the actual or estimated duration of the commercial and the desired number of frames to grab or the desired duration of display of each frame grabbed. As mentioned above, it should be appreciated that although implementations described herein utilize television commercial broadcasts as an example of the underlying media content that is the target of a fast forwarding action by a viewer, the disclosure and implementations provided herein are equally applicable to any type of underlying media content and is not limited to commercial content.

Sample calculation 302 shows a fast-forward duration formula 302A and an example fast-forward duration calculation 302B. The fast-forward duration formula 302A calculates the duration of the fast-forward time. The time of fast-forwarding is based on the duration of the commercial and the fast-forward rate. It should be appreciated that although this calculation as shown is based on a single commercial for simplicity, the calculation is equally applicable to any number of consecutive commercials as long as the number and length of the commercials is known or can be estimated. If this is not known or cannot be estimated, the calculation may be performed for each commercial at the start of each commercial. A benefit of performing the calculation for an entire commercial break rather than a single commercial at a time is that the total fast-forward duration increases and greater alternative media content time for a single overlying advertisement may be sold to an advertiser.

Looking at the fast-forward duration formula 302A, the fast-forward duration required to fast-forward through the entire playback of the commercial content may be calculated by dividing the total playback time, in real time, required for the commercial content by the fast-forward rate. This time may be found in a data structure associated with the commercial content as described below with respect to FIG. 5, or may be estimated based on a standard 30 or 60 second commercial. The fast-forward rate is the rate of accelerated playback of the underlying commercial content as desired by the viewer and as compared to the real time playback rate. Most DVRs allow a viewer to choose a fast-forward rate through multiple presses of a fast-forward button. A single press may speed the play rate to twice the real time rate. Pressing the fast-forward button twice may accelerate the play rate to six times the real time rate. This fast-forward rate is known by the DVR 102 since the DVR 102 utilizes this rate to accelerate the playback of the underlying media content according to the fast-forward rate selected by the viewer.

For simplicity, the total commercial duration and the fast-forward rate used in the example fast-forward duration calculation 302B is 60 seconds and 10 times, respectively. Using these numbers, the calculated fast-forward duration is 6 seconds. In other words, the time that it will take for the 60 second commercial to playback with a fast-forward rate of 10 times real time, is 6 seconds. The television broadcaster may sell a 6 second time slot for an alternative media content advertisement in addition to selling the 60 second slot.

As stated above, according to one implementation, a predetermined number of frames of the underlying media content are displayed as the alternative media content 205 for a predetermined length of time in a slideshow manner during the fast-forwarding duration of the underlying media content. After determining the fast-forward duration, either the number of frames desired for display or the duration of the display of each frame of the alternative media content must be known in order to calculate the other. Looking at the frame number formula 304, the number of frames required to be grabbed from the underlying media content for display as alternative media content during the fast-forward period is calculated from dividing the fast-forward duration determined using the fast-forward duration formula 302 by the desired display time for each frame of alternative media content. The example frame number calculation 304B shows that for a 6 second fast-forward duration and a desired display time of 1 second for each frame grabbed from the underlying commercial content 204, 6 frames must be grabbed for display. It should be understood that the alternative media content application 110 may grab these 6 frames randomly from the underlying media content, at equally spaced intervals, according to instructions stored within a data structure as described below with respect to FIG. 5, or according to any desired intervals preprogrammed into the application 110.

Sample calculation 306 shows the display time formula 306A and example display time calculation 306B. The display time formula 306A calculates the required display time for each frame of alternative media content to be displayed, assuming an equal amount of display time for each frame. It should be understood that variable display times may be programmed into the alternative media content application 110. According to the display time formula 306A, the required display time is determined by dividing the desired number of frames to grab from the underlying media content by the fast-forward duration. As an example, the example display time calculation 306B shows that if an advertiser desires 6 frames to be grabbed from the underlying media content and displayed during a fast-forward period lasting 6 seconds, then the duration of display for each frame would be 1 second, or a display rate of 1 frame per second.

Figure 4:
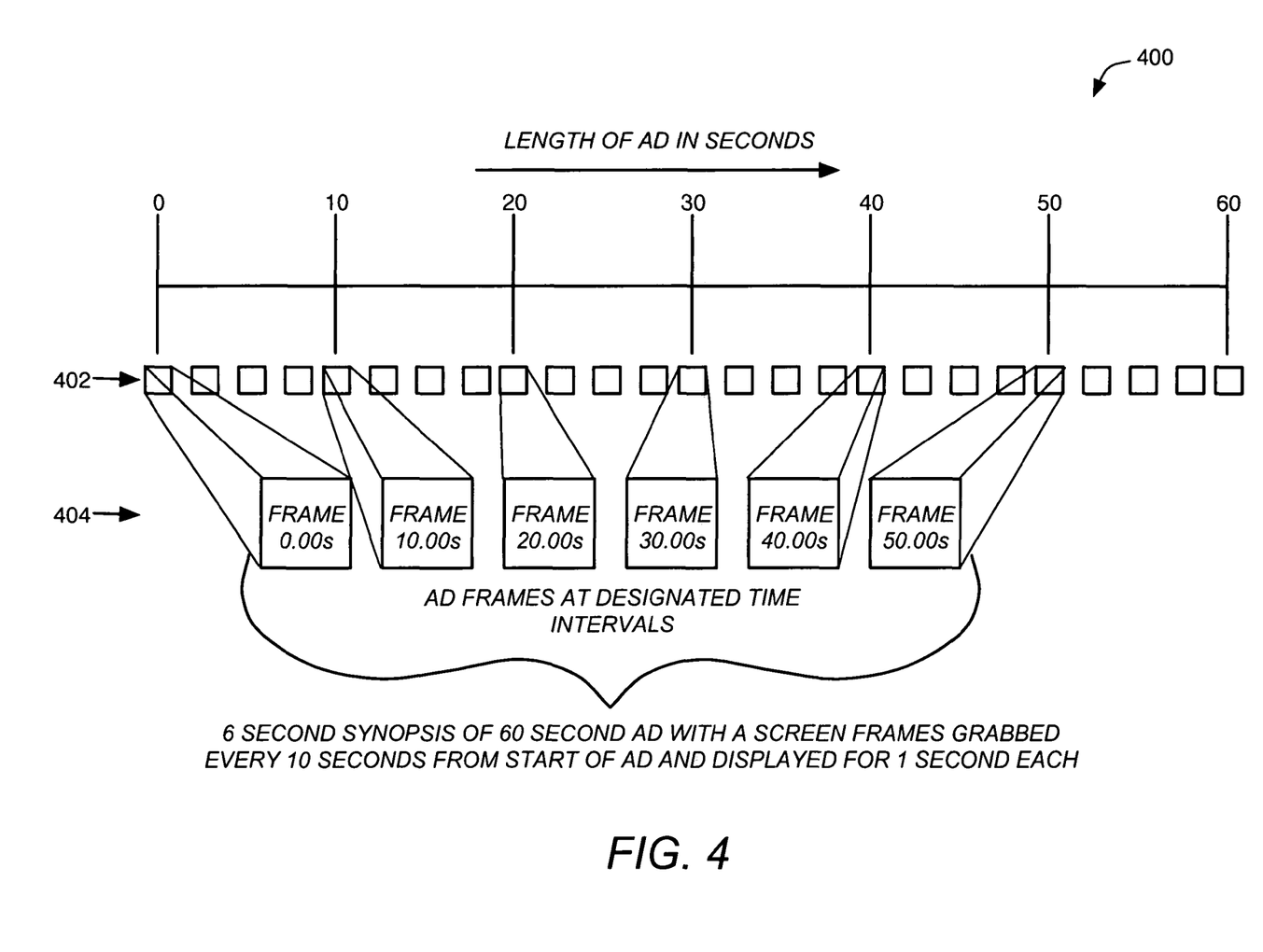
FIG. 4 is a functional timeline diagram showing illustrative examples of selecting alternative media content frames from underlying media content for display during a fast-forward period according to one embodiment presented herein.

FIG. 4 shows an example using the calculations from FIG. 3 and assuming that the preferred method of selecting screen frames is to select them at equal intervals. As seen in FIG. 4, a 60 second commercial or other secondary media content consists of a number of screen frames 402. Six screen frames are chosen for display as the overlying alternative media content during a fast-forwarding action. When the commercial is fast-forwarded at a 10 times rate, screen frames are chosen at equal 10 second intervals and displayed for 1 second each.

Figure 5:
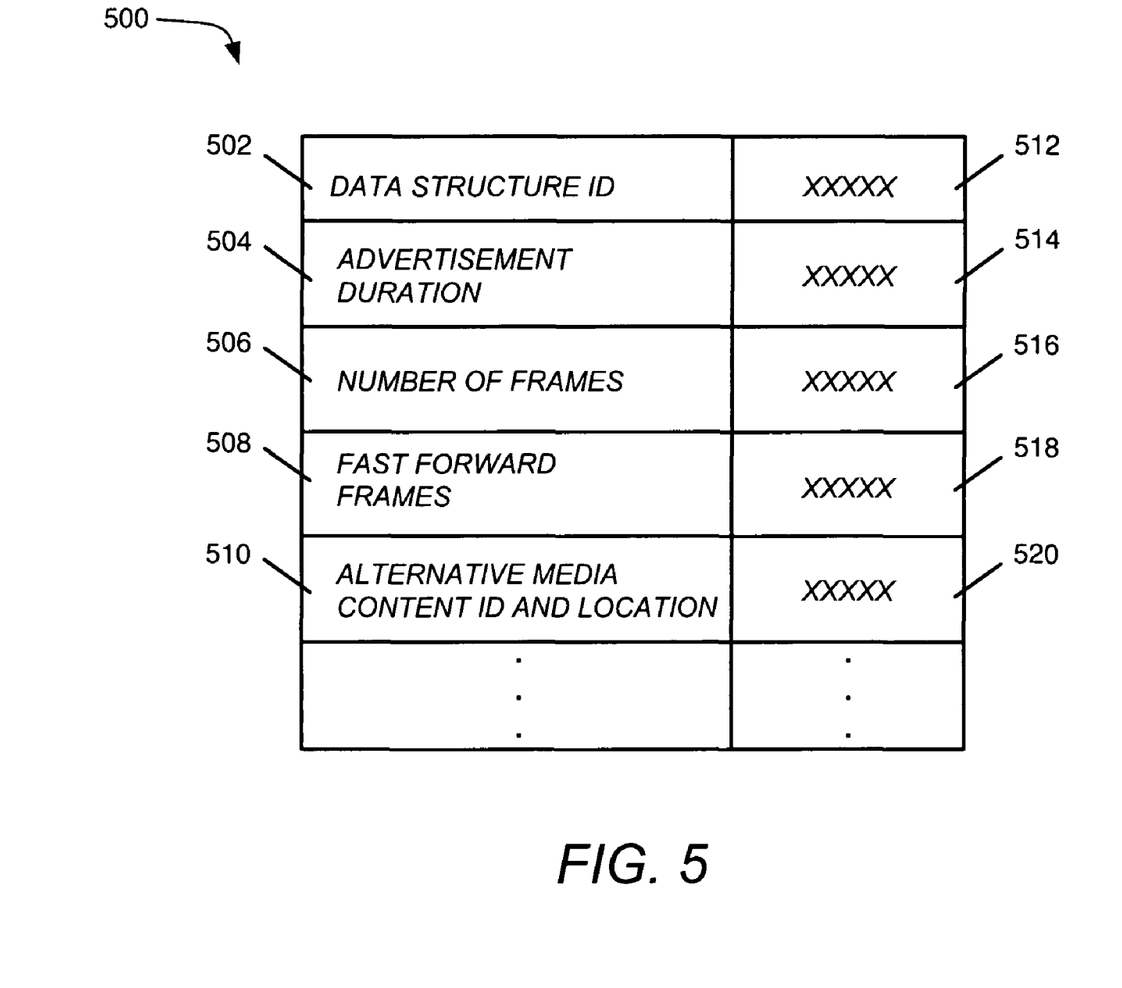
FIG. 5 is a block diagram showing an advertisement data structure according to one embodiment presented herein.

The precise screen frames to be displayed during a fast-forward action may be selected by an advertiser according to one implementation described herein and shown in FIG. 5. FIG. 5 shows an alternative media content data structure 500 that may be included with a media stream. The alternative media content data structure 500 includes data that aids the alternative media content application 110 in choosing the screen frames that the advertiser desires to be shown during a fast-forward action. The alternative media content data structure 500 contains data descriptions stored in fields 502, 504, 506, 508, and 510 with corresponding values stored in fields 512, 514, 516, 518, and 520. It should be understood that the alternative media content data structure 500 may include any amount and type of data desired by the advertiser and useful to the alternative media content application 110. The disclosure presented herein is not limited to the fields and data descriptions shown in FIG. 5.

The alternative media content data structure 500 includes a data structure global identifier stored in field 512 that the alternative media content application 110 searches for in order to locate the data structure 500 and the corresponding data. The alternative media content data structure 500 includes information relative to the calculations 300 described above such as the duration of the advertisement stored in field 514 and the desired number of frames to grab and display in field 516. The alternative media content data structure 500 may also include data corresponding to the exact frames to grab in field 518. With this data, the calculations 300 described above would not be necessary as the alternative media content application 110 would have precise instructions as to which frames to grab and display as well as for how long depending on the fast-forward rate (not shown). It should be understood that the frames selected by the advertiser and pointed to in field 518 in the alternative media content data structure 500 may be produced to be viewed at an accelerated rate. For example, certain frames of a commercial or other advertisement may be produced in a "slow-motion" rate when played back for a viewer in real-time, but are selected and played in a real-time rate for the viewer when the commercial is fast-forwarded. Similarly, select frames may be identified by an advertiser in the alternative media content data structure 500 for playback at a slower rate when the commercial is fast-forwarded.

According to another implementation, the alternative media content data structure 500 may include data in field 520 as to the identification and location of the alternative media content 205 to display during a fast-forward period. This alternative media content 205 may be separate media that is not grabbed from the underlying media content. In this manner, advertisers could broadcast alternative short commercials with the intended commercial content. The alternative short commercials could be produced specifically for the fast-forward periods and would only be seen if the commercial content were fast-forwarded. Files containing this alternative media content 205 could be transmitted with the commercial broadcast and stored in the memory 108, where it would be located by the alternative media content application 110 using the alternative media content data structure 500 in the event of a fast-forward action by a viewer.

Referring now to FIGS. 6, 7, 8A, and 8B, an illustrative routine will be described for providing alternative media content while providing underlying media content at a modified playback rate according to various embodiments presented herein. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

Figure 6:
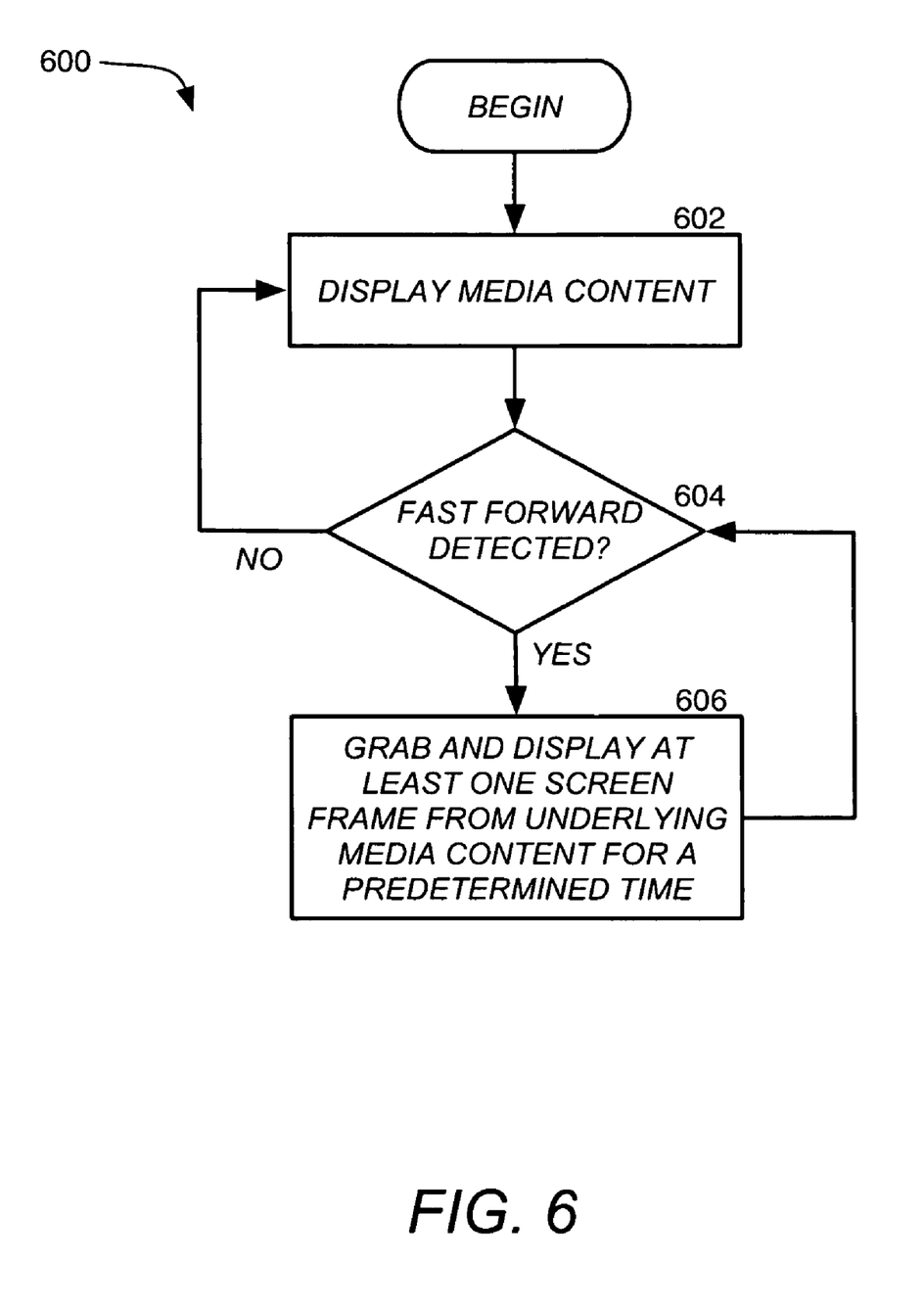

Turning to FIG. 6, an illustrative routine 600 for displaying screen frames from underlying media content during a fast-forward action will be described. The routine 600 begins at operation 602, where media content is displayed. The routine 600 continues to operation 604, where the alternative media content application 110 determines whether a fast-forward action is detected. This detection may be made from the viewer input using a remote control or on the DVR 102 itself, or may be made from monitoring the playback rate of the media content. If a fast-forward action is not detected, the routine returns to operation 602 and continues as described above. If a fast-forward action is detected at operation 604, then the routine 600 continues to operation 606, where the alternative media content application 110 grabs at least one screen frame from the underlying media content and transmits the at least one screen frame to the media controller 118 for display for a predetermined time. The screen frames may be displayed for any length of time programmed into the alternative media content application 110, for the duration of the fast forwarding action, or if the underlying media content is a commercial, the number of screen frames to grab and the duration for displaying each screen frame may be determined in any manner described above, such as utilizing the calculations 300 or a alternative media content data structure 500. From operation 606, the routine 600 returns to operation 604 and continues as described above.

Figure 7:
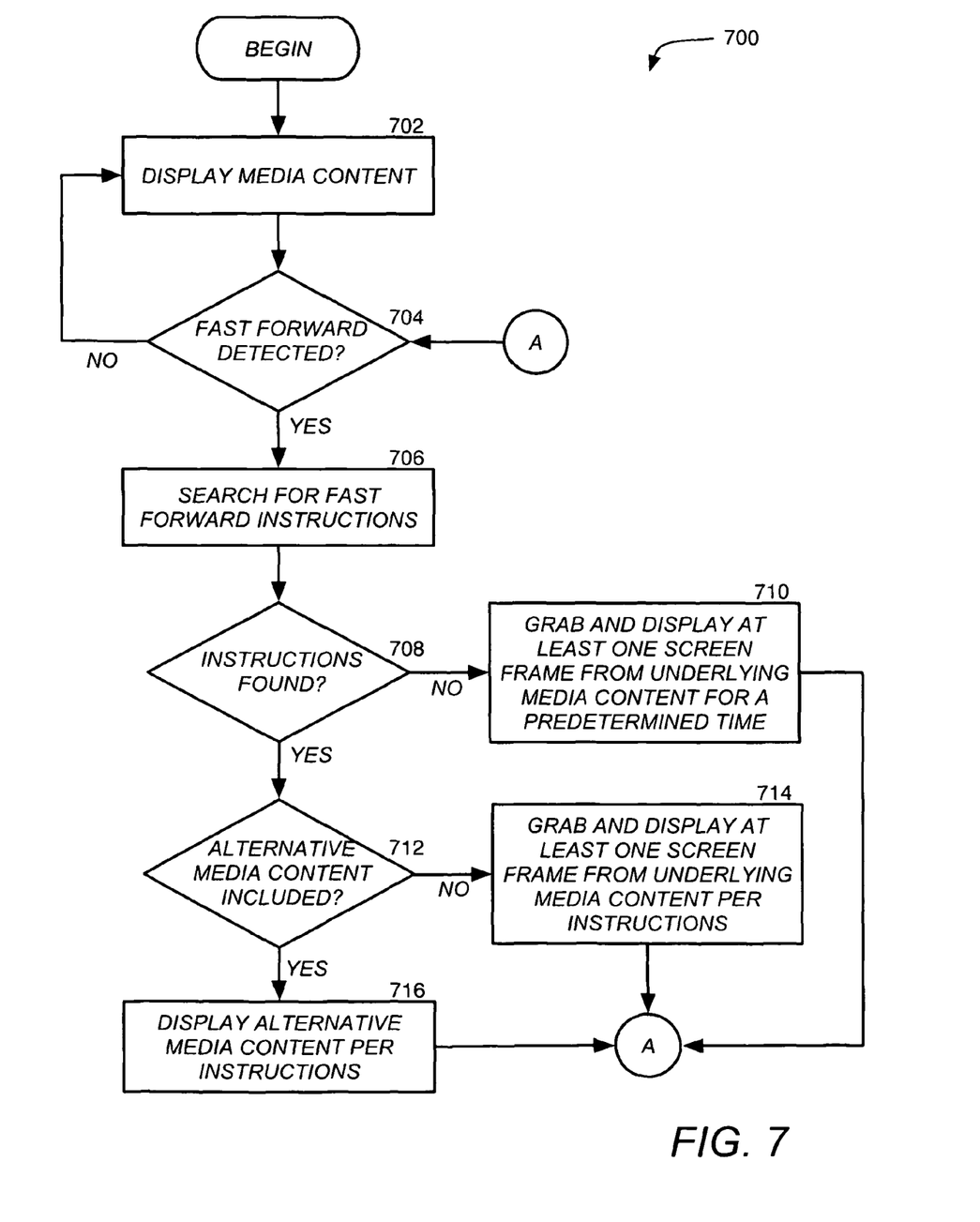

FIG. 7 shows an illustrative routine 700 for displaying alternative media content 205 during a fast-forward action. The routine 700 begins at operation 702, where media content is displayed for a viewer. At operation 704, the alternative media content application 110 makes a determination as to whether a fast-forward action is detected. As stated above, this detection may be made from the viewer input using a remote control or on the DVR 102 itself, or may be made from monitoring the playback rate of the media content. If a fast-forward action is not detected, the routine 700 returns to operation 702 and continues as described above. If a fast-forward action is detected at operation 704, then the routine 700 continues to operation 706, where the alternative media content application 110 searches for fast-forward instructions.

The alternative media content application 110 may be programmed to search the memory 108 for instructions regarding the alternative media content 205 to be displayed during a fast-forward action. These instructions may be stored in a separate location in the memory 108 from the application 110 so that they may be updated periodically by a television broadcast provider or by a DVR service provider. For example, the DVR 102 may not include specific instructions with the DVR 102 as sold. Periodically, as various alternative media content advertising is sold, the DVR service provider or a television broadcaster with permission of the DVR service provider may transmit a service update to the DVR 102 that includes specific instructions as to the procedures to take when a fast-forward action is detected. These instructions may even include the alternative media content 205 to be displayed during a fast-forward action. Additionally, the alternative media content application 110 may search for a data structure associated with specific underlying commercial content as described above.

Returning to the routine 700, the routine 700 proceeds from operation 706 to operation 708, where the alternative media content application 110 makes a determination as to whether instructions were located during the search. If no instructions were found, the routine 700 continues to operation 710, where the alternative media content application 110 grabs at least one screen frame from the underlying media content and transmits the at least one screen frame to the media controller 118 for display for a predetermined time. As described above, this procedure for grabbing and displaying screen frames may be preprogrammed into the alternative media content application 110 in the event that superseding instructions are not found. From operation 710, the routine 700 returns to operation 704 and proceeds as previously described. If, however, instructions were found at operation 708, then the routine 700 proceeds to operation 712, where the alternative media content application 110 makes a determination as to whether the alternative media content 205 was included with the instructions or identified by the instructions.

If the alternative media content 205 was not included with the instructions or identified by the instructions, then the routine 700 continues to operation 714, where the alternative media content application 110 grabs at least one screen frame from the underlying media content and transmits the at least one screen frame to the media controller 118 for display according to the instructions. From operation 714, the routine 700 returns to operation 704 and proceeds as previously described. If, however, a determination is made at operation 712 that the alternative media content 205 was included with the instructions or identified by the instructions, then the routine 700 proceeds to operation 716, where the alternative media content 205 is displayed according to the instructions. From operation 716, the routine 700 returns to operation 704 and proceeds as previously described.

Figure 8A:
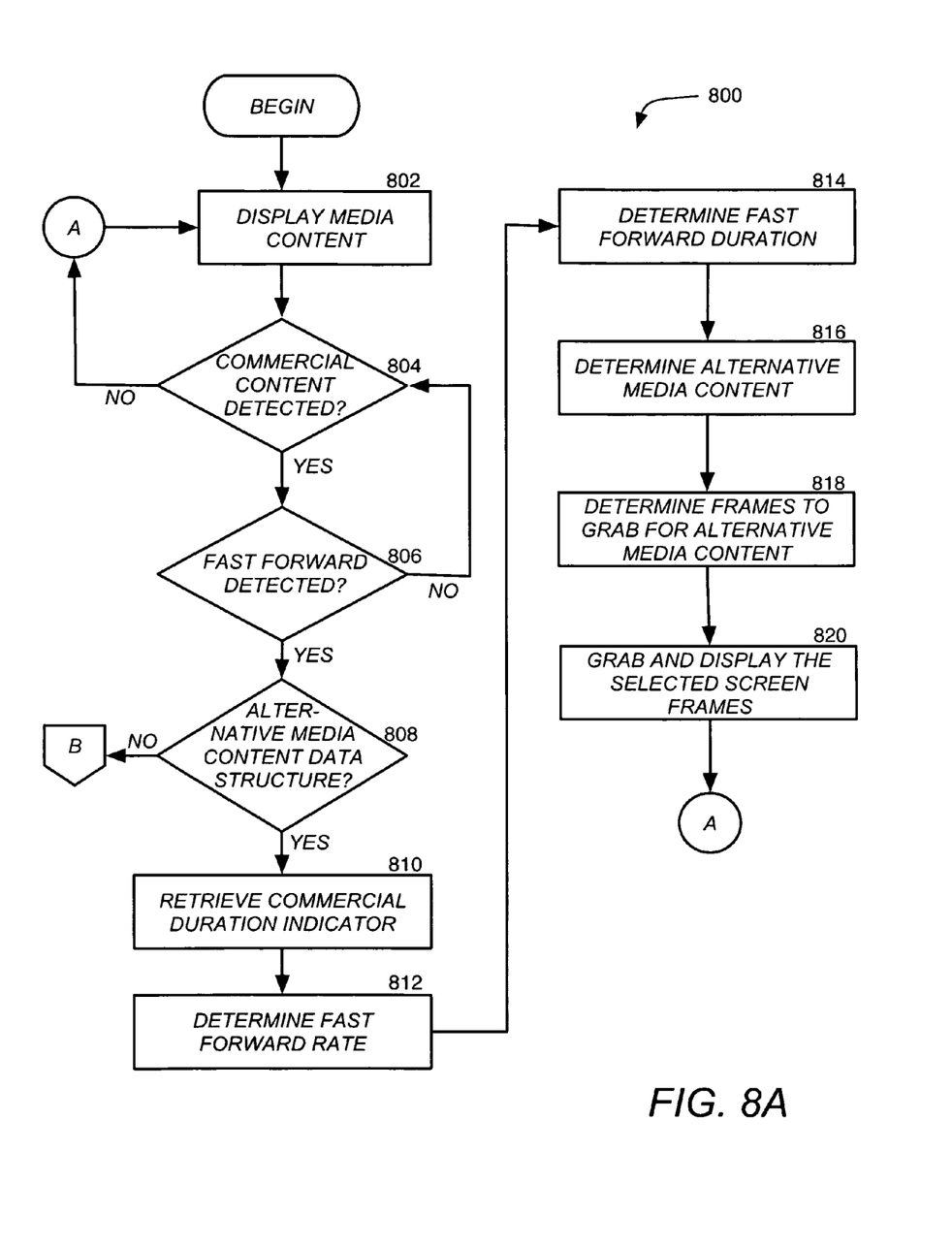
Figure 8B:
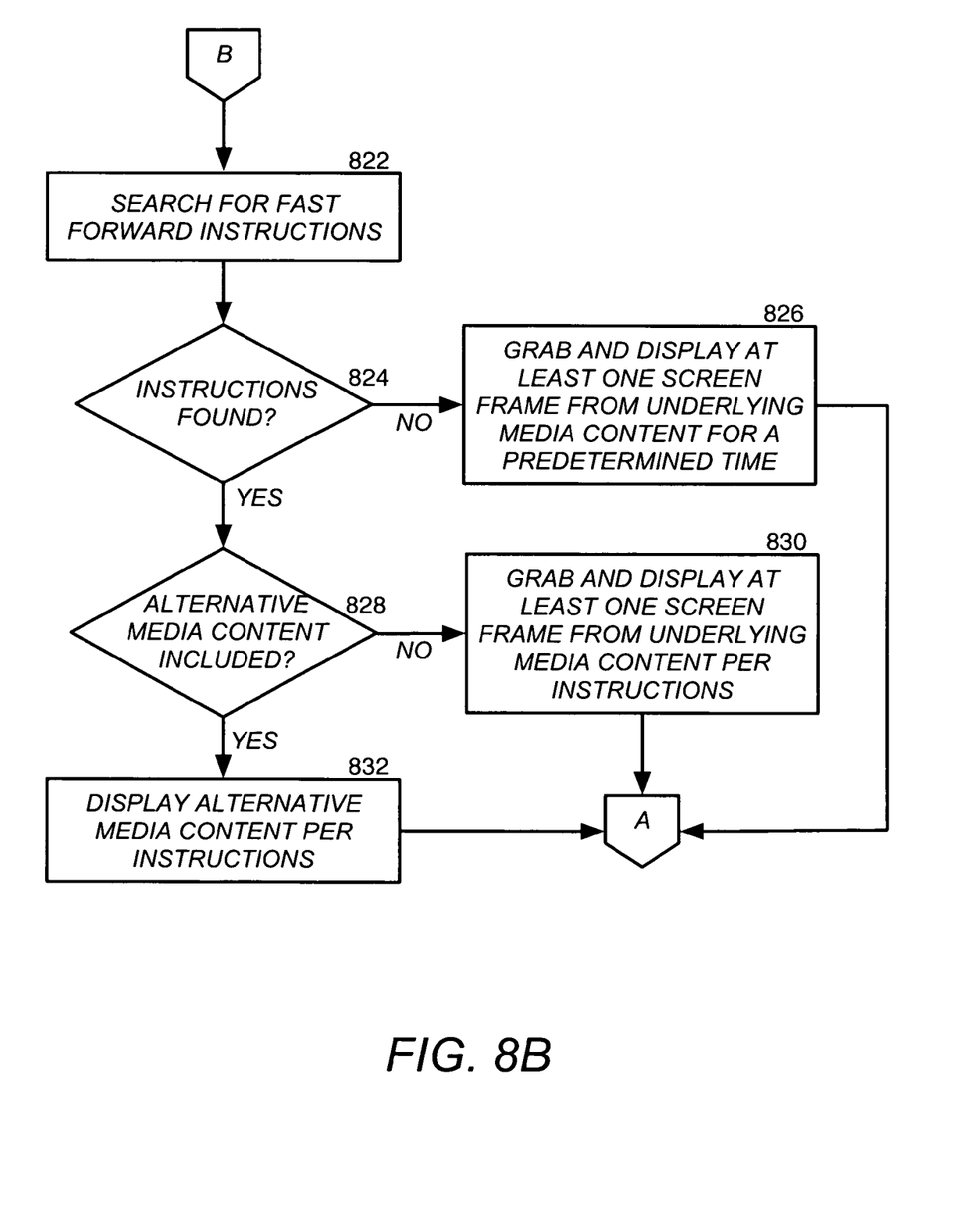

Turning to FIGS. 8A and 8B, an illustrative routine 800 for displaying the alternative media content 205 during a fast-forward action according to an alternative media content data structure 500 or other instructions will be described. The routine 800 begins at operation 802, where media content is displayed to a viewer. The routine 800 proceeds from operation 802 to operation 804, where the alternative media content application 110 makes a determination as to whether the media content is commercial content. As described above, various methods may be utilized to make this determination including using audible and visual commercial start and end detection techniques or detecting a commercial from an alternative media content data structure 500. If a determination is made that the media content is not commercial content, then the routine 800 returns to operation 802 and continues as described above.

If, however, a determination is made at operation 804 that the media content is commercial content, then the routine 800 proceeds to operation 806, where the alternative media content application 110 makes a determination as to whether a fast-forward action is detected. If a fast-forward action is not detected, then the routine 800 returns to operation 804 and continues as described above. If a fast-forward action is detected at operation 806, then the routine 800 continues to operation 808, where the alternative media content application 110 makes a determination as to whether the alternative media content data structure 500 associated with the commercial content exists. If it is determined that an alternative media content data structure 500 does exist, then the routine 800 proceeds to operation 810, where the alternative media content application 110 retrieves a commercial duration indicator 514 representing the total duration of the commercial content from the data structure. The routine 800 continues from operation 810 to operation 812, where the alternative media content application 110 determines the fast-forward rate. From operation 812, the routine 800 proceeds to operation 814, where the alternative media content application 110 determines the duration of the fast-forward action utilizing the calculations 300 described above. The routine 800 continues to operation 816, where the alternative media content application 110 determines the alternative media content 205 to display. As discussed above with respect to FIG. 5, the alternative media content data structure 500 may identify the alternative media content to be used during a fast-forward action, as seen in field 518. Alternatively, the data structure 500 may identify alternative media content 205 and where it may be found, as seen in field 520.

From operation 816, the routine 800 proceeds to operation 818, where the frames to be grabbed for display during the fast-forward action are selected for the alternative media content 205 by the alternative media content application 110. This action is necessary in the situation in which the alternative media content data structure 500 does not designate the frames to be grabbed and does not identify content 205 at a separate location to display. These frames may be selected using the data stored in the alternative media content data structure 500 and the calculations 300 described above. From operation 818, the routine 800 continues to operation 820, where the selected screen frames are grabbed and displayed during the fast-forward action. From operation 820, the routine 800 returns to operation 802 and continues as described above.

Returning now to operation 808, if a determination is made that an alternative media content data structure 500 does not exist, then the routine 800 proceeds to operation 822, where the alternative media content application 110 searches for fast-forward instructions. The routine 800 proceeds from operation 822 to operation 824, where the alternative media content application 110 makes a determination as to whether instructions were located during the search. If no instructions were found, the routine 800 continues to operation 826, where at least one screen frame from the underlying media content is grabbed and displayed for a predetermined time. From operation 826, the routine 800 returns to operation 802 and proceeds as previously described. If, however, instructions were found at operation 824, then the routine 800 proceeds to operation 828, where the alternative media content application 110 makes a determination as to whether the alternative media content 205 was included with the instructions or identified by the instructions.

If the alternative media content 205 was not included with the instructions or identified by the instructions, then the routine 800 continues to operation 830, where at least one screen frame from the underlying media content is grabbed and displayed according to the instructions. From operation 830, the routine 800 returns to operation 802 and proceeds as previously described. If, however, a determination is made at operation 828 that alternative media was included with the instructions or identified by the instructions, then the routine 800 proceeds to operation 832, where the alternative media content application 110 displays the alternative media content 205 according to the instructions. From operation 832, the routine 800 returns to operation 802 and proceeds as previously described.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing alternative media content, comprising:
    displaying the underlying media content comprising a television commercial advertisement at a first playback rate;
    detecting a modification of an actual playback rate from the first playback rate to a second playback rate, the modification comprising fast-forwarding the television commercial advertisement;
    as a result of detecting the modification of the actual playback rate, retrieving screen frames from the television commercial advertisement at predetermined time intervals, wherein the predetermined time intervals are determined from the duration of the television commercial advertisement, the second playback rate, and a desired number of screen frames to display during the playback of the television commercial advertisement at the second playback rate; and
    displaying the screen frames retrieved from the television commercial advertisement.

2. A method for providing alternative media content, comprising:
    displaying the underlying media content comprising a television commercial advertisement at a first playback rate;
    detecting a modification of an actual playback rate from the first playback rate to a second playback rate, the modification comprising fast-forwarding the television commercial advertisement;
    as a result of detecting the modification of the actual playback rate, retrieving screen frames from the television commercial advertisement at predetermined time intervals, wherein the predetermined time intervals are retrieved from a data structure associated with the commercial advertisement, wherein the data structure comprises data corresponding to the television commercial advertisement duration and time intervals for retrieving select screen frames according to the second playback rate and television commercial advertisement duration; and
    displaying the screen frames retrieved from the television commercial advertisement.

3. A method for providing alternative media content, comprising:
    displaying the underlying media content at a first playback rate;
    detecting a modification of an actual playback rate from the first playback rate to a second playback rate;
    as a result of detecting the modification of the actual playback rate, retrieving the alternative media content;
    searching for instructions regarding a display of the alternative media content upon the detection of the modification of the actual playback rate;
    if instructions are located during the search, displaying the alternative media content according to the instructions; and
    if instructions are not located during the search, displaying the alternative media content by grabbing and displaying at least one screen frame from the underlying media content.

4. The method of claim 1, wherein the alternative media content comprises images stored in a memory of a media playback device.

5. A method for providing selected media content during fast-forwarding of underlying media content, comprising:
    providing the underlying media content comprising a primary media content and a commercial advertisement to a display at a first playback rate;

displaying the primary media content at the first playback rate;
detecting a transition from the primary media content to the one or more commercial advertisements;
detecting the fast-forwarding of the underlying media content from the first playback rate to a second playback rate;
grabbing at least one screen frame from the underlying media content;
providing the at least one screen frame from the underlying media content to the display during the fast-forwarding of the underlying media content at the second playback rate, wherein the at least one screen frame is provided for display at a playback rate that is slower than the second playback rate;
detecting a transition from the one or more commercial advertisements to the primary media content; and
discontinuing the display of the at least one screen frame as a result of detecting the transition from the one or more commercial advertisements to the primary media content.

6. The method of claim 5, further comprising:
detecting a return to the first playback rate from the second playback rate; and
discontinuing the display of the at least one screen frame as a result of detecting the return to the first playback rate.

7. The method of claim 5, wherein grabbing at least one screen frame from the underlying media content comprises grabbing screen frames from the commercial advertisement at predetermined time intervals.

8. A method for providing selected media content during fast-forwarding of underlying media content, comprising:
providing the underlying media content comprising a commercial advertisement to a display at a first playback rate;
detecting the fast-forwarding of the underlying media content from the first playback rate to a second playback rate;
grabbing at least one screen frame from the underlying media content comprises grabbing screen frames from the commercial advertisement at predetermined time intervals that are determined from the duration of the commercial advertisement, the second playback rate, and a desired number of screen frames to display during the playback of the commercial advertisement at the second playback rate; and
providing the at least one screen frame from the underlying media content to the display during the fast-forwarding of the underlying media content at the second playback rate, wherein the at least one screen frame is provided for display at a playback rate that is slower than the second playback rate.

9. A method for providing selected media content during fast-forwarding of underlying media content, comprising:
providing the underlying media content comprising a commercial advertisement to a display at a first playback rate;
detecting the fast-forwarding of the underlying media content from the first playback rate to a second playback rate;
grabbing at least one screen frame from the underlying media content comprises grabbing screen frames from the commercial advertisement at predetermined time intervals that are retrieved from a data structure associated with the commercial advertisement, wherein the data structure comprises data corresponding to the commercial advertisement duration and time intervals for retrieving select screen frames according to the second playback rate and commercial advertisement duration; and
providing the at least one screen frame from the underlying media content to the display during the fast-forwarding of the underlying media content at the second playback rate, wherein the at least one screen frame is provided for display at a playback rate that is slower than the second playback rate.

10. A method for providing selected media content during fast-forwarding of underlying media content, comprising:
providing the underlying media content to a display at a first playback rate;
detecting the fast-forwarding of the underlying media content from the first playback rate to a second playback rate;
grabbing at least one screen frame from the underlying media content;
searching for instructions regarding the display of the alternative media content upon the detection of the fast-forwarding of the underlying media content;
providing the at least one screen frame from the underlying media content to the display during the fast-forwarding of the underlying media content at the second playback rate, wherein the at least one screen frame is provided for display at a playback rate that is slower than the second playback rate; and
if instructions are located during the search, displaying the alternative media content according to the instructions.

11. A computer-readable medium having computer-executable instructions stored thereon which, when executed by a computer, cause the computer to:
display the underlying media content according to a first playback rate;
detect a modification of a playback rate of the underlying media content from the first playback rate to a second playback rate;
determine the duration of the playback of the underlying media content at the second playback rate;
select the alternative media content according to the determined playback duration of the underlying media content at the second playback rate; and
display the alternative media content for the duration of the playback of the underlying media content at the second playback rate.

12. The computer-readable medium of claim 11, wherein causing the computer to determine the duration of the playback of the underlying media content at the second playback rate comprises causing the computer to utilize the second playback rate and the actual or estimated duration of the underlying media content.

13. The computer-readable medium of claim 11, wherein the underlying media content comprises television programming, wherein the modification comprises fast-forwarding the television programming, and wherein the alternative media content comprises screen frames selected from the television programming.

14. The method of claim 2, wherein the alternative media content comprises images stored in a memory of a media playback device.

15. The method of claim 3, wherein the underlying media content comprises television programming, wherein the modification comprises fast-forwarding the television programming, and wherein the alternative media content comprises media content unrelated to the television programming.

16. The method of claim 3, wherein retrieving the unrelated to the television programming comprises retrieving the alternative media content from a memory location of a media playback device.

17. The method of claim 3, wherein the alternative media content comprises images stored in a memory of a media playback device.

18. The method of claim 8, further comprising:
detecting a return to the first playback rate from the second playback rate; and
discontinuing the display of the at least one screen frame as a result of detecting the return to the first playback rate.

19. The method of claim 9, further comprising:
detecting a return to the first playback rate from the second playback rate; and
discontinuing the display of the at least one screen frame as a result of detecting the return to the first playback rate.

20. The method of claim 10, further comprising:
detecting a return to the first playback rate from the second playback rate; and
discontinuing the display of the at least one screen frame as a result of detecting the return to the first playback rate.

* * * * *